United States Patent [19]

Kobayashi et al.

[11] Patent Number: 4,981,048
[45] Date of Patent: Jan. 1, 1991

[54] COLUMN-MOUNTED CONTROL DEVICE FOR TRANSMISSION

[75] Inventors: Satoshi Kobayashi, Hiratsuka; Koji Kato, Shizuoka, both of Japan

[73] Assignees: Nissan Motor Co., Ltd.; Fuji Kiko Co., Ltd., both of Yokohama, Japan

[21] Appl. No.: 257,575

[22] Filed: Oct. 14, 1988

[30] Foreign Application Priority Data

Oct. 16, 1987 [JP] Japan .......................... 62-158961[U]

[51] Int. Cl.$^5$ ............................................. B60R 25/02
[52] U.S. Cl. ................................ 74/483 R; 74/483 K; 180/336; 192/4 A
[58] Field of Search ...................... 74/483 R, 483 K; 192/4 A, 4 C, 9; 180/271, 336

[56] References Cited

U.S. PATENT DOCUMENTS

| 2,875,640 | 3/1959 | Huso | 74/483 K |
| 3,942,614 | 3/1976 | Thompson | 192/4 A |
| 4,096,930 | 6/1978 | Viscardi | 192/4 A |
| 4,187,935 | 2/1980 | O'Hern | 192/4 A |

Primary Examiner—Leslie A. Braun
Assistant Examiner—Scott Anchell
Attorney, Agent, or Firm—Pennie & Edmonds

[57] ABSTRACT

A control lever of a column-mounted control device for an automatic transmission is installed on a steering column in such a way as to be rotatable in the circumferential direction of the steering column for selection of gears. A location mechanism is operative to releasably limit rotation of the control lever in the circumferential direction of the steering column and locates the control lever in one of gear positions including a stoppage gear. The control lever is released from the above described limitation in rotation in the circumferential direction of the steering column when pulled toward a driver's seat. A location sensor is operative to detect that the above described limitation in rotation of the control lever is performed in the stoppage gear by the location mechanism and produce a stoppage signal representative thereof. A brake sensor is operative to detect a braking operation and produce a braking signal representative thereof. A shift lock mechanism prevents the pulling of the control lever toward the driver's seat and disables the control lever from being released from the above described limitation in rotation by the location means when receiving the stoppage signal only. When the shift lock mechanism receives both of the stoppage signal and the braking signal, it allows the pulling of the control lever toward the driver's seat and enables the control lever from being released from the above described limitation in rotation by the location mechanism.

1 Claim, 3 Drawing Sheets

COLUMN-MOUNTED CONTROL DEVICE FOR TRANSMISSION

BACKGROUND OF THE INVENTION

1. Field of the Invention

The present invention relates in general to a transmission control and more particularly to a column-mounted control device for a transmission which is adapted to shift or select gears by operating a control lever mounted on a steering column.

2. Description of the Prior Art

Two types of transmission control devices, i.e., a floor-mounted type and column-mounted type are known for use in automatic transmission equipped vehicles.

A known column-mounted control device for a transmission is constructed so that by pulling a control lever in the direction of a driver's seat the control lever is released from a limited condition in which a location mechanism limits rotation of the control level in the circumferential direction of the column shaft.

While the prior art column-mounted control device is selectively movable into various gear positions as a parking position, reverse gear position, neutral position, drive gear position, middle speed gear position and low speed gear position with a certain assuredness and reliability, it is desirable that the selection of the gear positions be performed more assuredly and reliably.

SUMMARY OF THE INVENTION

In accordance with the present invention, there is provide an improved column-mounted control device for an automatic transmission which comprises a steering column, a control lever installed on the steering column in such a way as to be rotatable in the circumferential direction of the steering column for selection of gears, and location means for locating the control lever in one of gear positions including a stoppage position and releasably limiting rotation of the control lever out of the selected gear position in the circumferential direction of the steering column.

The control lever is released from the limitation in rotation in the circumferential direction of the steering column when bodily moved in a predetermined direction.

The control device further comprises a location sensor operative to detect that the limitation in rotation of the control lever in the circumferential direction of said steering column is performed in the stoppage position by the location means and produce a stoppage signal representative thereof, a brake sensor operative to detect a braking operation and produce a braking signal representative thereof, and shift lock means for preventing the bodily movement of the control lever in the predetermined direction and disabling the control lever form being released from the limitation in rotation by the location means when receiving the stoppage signal only and for allowing the bodily movement of the control lever in the predetermined direction and enabling the control lever from being released from the limitation in rotation by the location means when receiving both of the stoppage signal and the braking signal.

The above structure is effective for performing selection of transmission gears more assuredly and reliably.

It is accordingly an object of the present invention to provide an improved column-mounted control device for an automatic transmission which can perform selection of gears more assuredly and reliably.

It is another object of the present invention to provide an improved column-mounted control device of the above described character which is particularly desirable and useful from a safety driving point of view.

DESCRIPTION OF THE PRIOR ART

Figure 1:
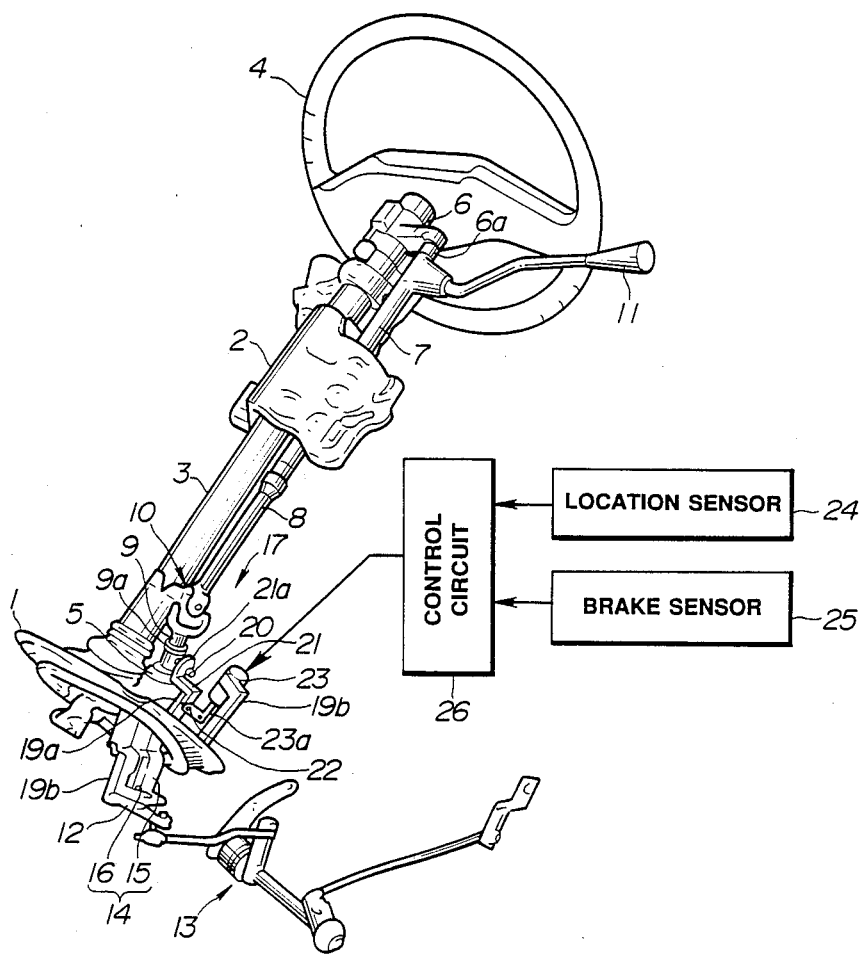
FIG. 1 is a perspective view of a column-mounted control device for an automatic transmission according to an embodiment of the present invention.

Referring to FIG. 1, a column support lower member is indicated by the reference numeral 1 and attached to a dash lower panel (not shown) of an automatic transmission equipped vehicle. A column support upper member 2 is attached to an instrument panel (not shown). A steering column 3 is tubular in shape and supported at the upper and lower end portions on the column support memebers 2 and 1, respectively. A steering wheel 4 is installed on the upper end of a column shaft (not shown) received within the steering column 3.

The column support lower member 1 has an integral boss portion 5 projecting upwardly. The steering column 3 has an integral shaft support projection 6 at the upper end and on the side corresponding to the boss portion 5 and one side of the column support upper member 2. The shaft support projection 6 has fixedly attached thereto a stopper pin 6a extending toward the column support upper member 2 and in parallel to the steering column 3. An upper tubular shaft 7 is supported on the column support upper member 2 on the above described one side thereof and in parallel to the steering column 3 in such a way as to be axially movable and rotatable about its axis. The upper end inner circumferential surface of the tubular shaft 7 is slidably fitted on the outer circumferential surface of the stopper pin 6a.

Figure 2:
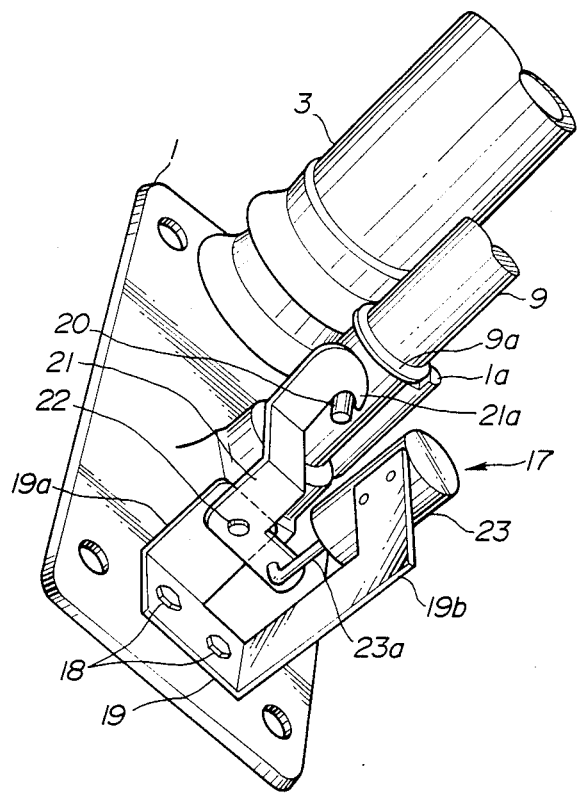
FIG. 2 is an enlarged perspective view of a shift locking mechanism employed in the embodiment of FIG. 1.

An intermediate shaft 8 has an upper end portion fitted in and secured to the upper tubular shaft 7, and between the upper end of the intermediate shaft 8 and the lower end of the stopper pin 6a there is interposed a spring (not shown). This spring urges the upper tubular shaft 7 and the intermediate shaft 8 downwardly. On the other hand, a lower shaft 9 is supported on and passes through the boss portion 5 in such a way as to be axially movable and rotatable about its axis. The upper end portion of the lower shaft 9 and the lower end portion of the intermediate shaft 8 are interconnected by a universal joint 10. In the meantime, as shown in FIGS. 1 and 2, the upper end portion of the lower shaft 9 has an integral flange 9a, and the column support member 1 has at the upper surface a stopper 1a which prevents downward movement of the stopper flange 9a. The stopper flange 9a is urged by the above described spring and brought into abutment upon the upper end portion of the stopper 1a. Furthermore, the upper tubular shaft 7, intermediate shaft 8 and the lower shaft 9 are axially movable by a predetermined amount which is determined by the stopper pin 6a, stopper flange 9a and the stopper 1a.

The upper tubular shaft 7 has fixedly secured thereto at an upper end portion a controll level 11, i.e., an end portion of the control lever 11 is inserted into the upper end portion of the upper tubular shaft 7 and secured thereto. The control lever 11 is therefore connected to the intermediate shaft 8 so as to be rotatably therewith. By this, back and forth movements of the control lever 11 causes the upper tubular shaft 7, intermediate shaft 8 and the lower shaft 9 to axially move back and forth all together whereas rotation or swinging of the control lever 11 about the axis of the upper tubular shaft 7 causes the upper tubular shaft 7, intermediate shaft 8 and the lower shaft 9 to rotate about the their axes all together.

Fixed to the lower end portion of the outer circumference of the lower shaft 9 is a tubular member 9b which is integrally provided with a select lever 12 which is in turn operatively connected via a linkage 13 to a range select lever of a transmission (now shown) so as to be movable therewith. Rotation of the lower shaft 9 about its axis causes the select lever 12 to rotate together therewith, thus operating the range select lever of the transmission by way of the linkage 13 and thereby performing a gear selection operation.

Figure 3:
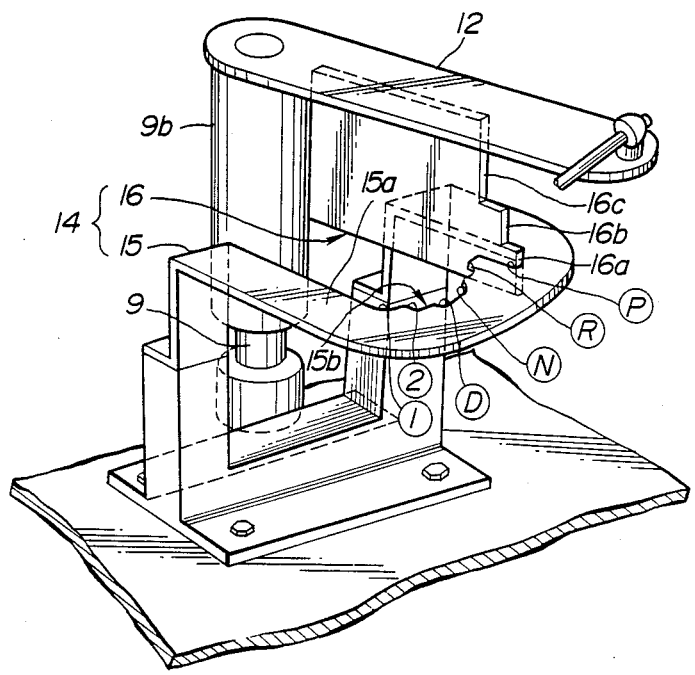
FIG. 3 is an enlarged perspective view of a location mechanism employed in the embodiment of FIG. 1.
Figure 4:
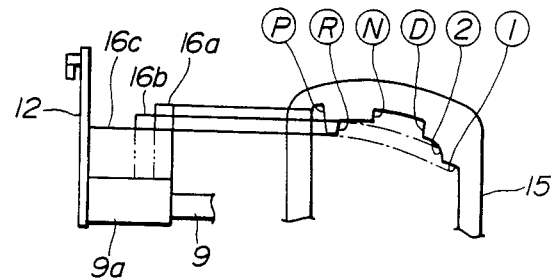
FIG. 4 is a plan view showing a relation between a location plate and location steps of a position plate employed in the embodiment of FIG. 1.

As shown in FIGS. 1 and 3, a location mechanism 14 is interopsed between the lower surface of the column support lower member 1 and the lower end portion of the lower shaft 9 for locating the control lever 11 in one of the following gear positions and limiting rotation of the control lever 11 out of the selected gear position in the circumferential direction of the steering column 3. The location mechanism 14 consists of a position plate 15 secured to the lower surface of the column support lower member 1 and a location plate 16 integreally secured at an end to a tubular portion 9b of the lower shaft 9.

The position plate 15 has a U-like configured portion 15a having a stepped inner periphery 15b. The stepped inner periphery 15b includes steps for location of a parking position (P), reverse position (R), neutral position (N), drive position (D), middle speed position (2) and a low speed position (1), respectively. The U-like configured portion 15a is arranged substantially perpendicular to the location plate 16. The location plate 16 has a stepped end at the other end opposite to the above described one end where it is secured to the lower shaft 9. The stepped end of the location plate 16 is engageable with the stepped inner periphery of the location plate 15 and includes a first step 16a, second step 16b and a third step 16c which are arranged in such a manner that the step nearer to the control lever is located at the more distance from the axis of the lower shaft 9. The first step 16a is so formed as to be lockingly engageable with the steps of the position plate 15 for location of the parking position (P), neutral position (N) and the drive gear position (D), respectively. The second step 16b is so formed as to be lockingly engageable with the steps of the position plate 15 for location of the reverse position (R) and the middle speed position (2), respectively. The third step 16c is lockingly engageable with the step of the position plate 15 for location of the low speed position (1).

As shown in FIGS. 1 and 2, a shift lock mechanism 17 is interposed between the upper surface of the column suport lower member 1 and the upper portion of the lower shaft 9. The shift lock mechanism 17 consists of a bracket 19 secured to the upper surface of the column support lower member 1 with bolts 18, a lock pin 20 provided to the lower shaft 9 to project therefrom, a lock arm 21 having a hooked portion 21a at one end, a pivot 22 rotatably mounting the lock arm 21 on a support arm 19a of a bracket 19 and a solenoid 23 mounted on another support 19b of the bracket 19.

The solenoid 23 has a solenoid pin 23a which is pivotally connected at an end to the other end portion of the lock arm 21 opposite to the above described one end provided with the hooked portion 21a. When there is no supply of current to the solenoid 23, and hooked portion 21a of the lock arm 21 is located aside of the upwardly movable zone of the lock pin 20, i.e., disengaged from the lock pin 20. When current is supplied to the solenoid 23 to energize the same, the solenoid pin 23a projects from the solenoid 23 thus rotating the lock arm 21 in the clockwise direction in FIG. 2, whereby the hooked portion 21a of the lock arm 21 is moved into the upwardly movable zone of the lock pin 20, i.e., the hooked portion 21 is lockingly engaged with the lock pin 21 so that the upward movement of the lock pin 20 is prevented by the hooked portion 21a.

In FIG. 1, a location sensor is indicated by the reference numeral 24 and operative to detect that limitation in rotation of the control lever 11 about the axis of the upper tubular shaft 7, i.e., in the circumferential direction of the steering column 3 for selection of gear is performed in the parking position by the location mechanism 14 and produce a parking signal representative thereof. The location sensor 24 may be an inhibitor switch for detecting a gear shift position of the transmission. Further, a microswitch may otherwise be used for detecting that the location plate 16 is in the parking position, whereby to serve as the location sensor 24.

Further, a brake sensor is indicated by the reference numeral 25 and operative to detect a braking operation and produce a produce a braking signal representative thereof. The brake sensor 25 can be a switch which is turned on by the operation of a brake pedal (not shown) at the time of rotation of the brake pedal toward the dash lower panel. This switch may be installed on the dash lower panel or on a bracket supporting the brake pedal. Further, the brake sensor 25 may be a switch installed on the brake pedal.

The parking signal produced by the location sensor 24 and the braking signal produced by the brake sensor 25 are supplied to a control circuit 26. When the control circuit 26 receives the parking signal only, it supplies current to the solenoid 23 for thereby allowing the solenoid pin 23a of the solenoid 23 to project and thereby disabling to release the control lever 11 from limitation in rotation in the circumferential direction of the steering column 3 by the location mechanism 14. On the other hand, when the control circuit 26 receives both of the parking signal and the braking signal, it stops supplying current to the solenoid 23 for thereby allowing the solenoid pin 23a to retract and return to its original position, thus enabling to release the control lever 11 from the above described limitation in rotation by the location mechanism 14.

The column-mounted control device for the transmission of this invention operates as follows:

When the control lever 11 is in the parking position, the first step 16a of the location plate 16 is held lockingly engaged with the step of the position plate 15 for location of the parking position (P). In this instance, switching on of an ignition switch (not shown) causes the location sensor 24 to produce a parking signal and supply it to the control circuit 26. The control circuit 26 thus supplies current to the solenoid 23. By this, the solenoid pin 23a projects from the solenoid 23 thus rotating the lock arm 21 in the clockwise direction in FIG. 2 and thereby allowing the hooked portion 21a of the lock arm 21 to move into the upwardly movable zone of the lock pin 20, i.e., allowing the hooked portion 21a to be engaged with the lock pin 21, so that the hooked portion 21a prevents upward movement of the lock pin 20.

Accordingly, under this condition, even if it is tried to pull or bodily move the control lever 11 toward the driver's seat, upward movement of the intermediate shaft 8 and the lower shaft 9 is prevented by the shift lock mechanism 17 and therefore it is impossible to release the control lever from limitation in rotation in the circumferential direction by the location mechanism 14. As a result, it is impossible to rotate the control lever 11 out of the parking position into other gear positions through rotation in the circumferential direction of the steering column 3, i.e., to perform a gear shift or selection operation by means of the control lever 11.

On the other hand, if the brake pedal is depressed under such a parking condition the brake sensor 25 produces a brake signal and supplies it to the control circuit 26. The control cirucit thus stops suppling current to the solenoid 23. By this, the solenoid pin 23a of the solenoid 23 retracts and returns to its original position, thus allowing the hooked portion 21a of the lock arm 21 to go away from the upwardly movably zone of the lock pin 20, i.e., allowing the hooked portion 21a to be disengaged from the lock pin 21a, thus unlocking the shift lock mechanism 17. Accordingly, pulling or bodily moving the control lever 11 toward the driver's seat under this condition causes the intermediate shaft 8 and lower shaft 9 to move upwardly, thus allowing the location plate 16 to move upwardly and disengaging the first and second steps 16a and 16b from the step of the position plate 15 for location of the parking position Ⓟ. As a result, it becomes possible to move the control lever 11 out of the parking position through rotation in the circumferential direction of the steering column 3 to perform a gear shift or selection operation..

While in the foregoing the stoppage or standstill position has been described as being the parking position, it may otherwise be the neutral positon.

What is claimed is:

1. A column-mounted control device for an automatic transmission comprising:
   a steering column;
   a rotably mounted control lever means installed on said steering column for selecting one of a plurality of gears by rotating said lever means to one of a plurality of corresponding gear positions;
   location means for locating said lever means in one of said gear position including a stoppage position, and releasably limiting rotation of said lever means in the selected gear position;
   said lever means being released from said limitation in rotation when said lever means is moved in a predetermined axial direction of said steering column;
   a location sensor operative to detect when said lever means is in said stoppage position and produce a stoppage signal representative thereof;
   a brake sensor operative to detect a braking operation and produce a braking signal representative thereof; and
   shift lock means for preventing movement of said lever means in said predetermined axial direction of said steering column, thereby disabling said lever means from being released from said stoppage position when receiving said stoppage signal only and for allowing said movement of said lever means in said predetermined axial direction of said steering column and enabling said control lever means from being released from said stoppage positon when receiving both said stoppage signal and said braking signal;
   said shift lock means including a lock pin movable in said predetermined axial direction in response to said movement of said lever means in said predetermined axial direction of said steering column, a lock arm having a hooked portion and swingable between a first position where said hooked portion is disengaged from said lock pin to allow said movement in said predetermined axial direction thereof, and a second position where said hooked portion is disengaged from said lock pin to allow said movement in said predetermined axial direction, a solenoid for controlling operation of said lock arm in response to signals from said location sensor and said brake sensor to rotate said lock arm into said first position when receiving said stoppage signal only and into said second position when receiving both of said stoppage signal and said brake signal;
   said location means including a position plate having a U-like configured portion having a stepped inner periphery and a location plate arranged perpendicularly to said U-like configured portion of said position plate and having a stepped end lockingly engageable with said stepped inner periphery to effect said limitation in rotation of said control lever means, said location plate being movable in said predetermined axial direction to disengage said locking engagement of said stepped end with said stepped inner periphery in response to said movement of said control lever means in said predetermined axial direction of said steering column and rotatable to change relative positions of said stepped end and said stepped inner periphery corresponding to said rotation of said control lever means.

* * * * *